(12) United States Patent
Johnson

(10) Patent No.: US 11,682,071 B1
(45) Date of Patent: *Jun. 20, 2023

(54) GRAPHICAL USER INTERFACE SYSTEM AND METHOD

(71) Applicant: Wells Fargo Bank, N.A., San Francisco, CA (US)

(72) Inventor: Amy L. Johnson, Berkeley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,620

(22) Filed: May 26, 2021

Related U.S. Application Data

(63) Continuation of application No. 16/723,994, filed on Dec. 20, 2019, now Pat. No. 11,037,234, which is a continuation of application No. 12/463,298, filed on May 8, 2009, now Pat. No. 10,586,277.

(60) Provisional application No. 61/053,478, filed on May 15, 2008.

(51) Int. Cl.
   *G06Q 40/02* (2023.01)
   *G06Q 10/10* (2023.01)
   *G06Q 20/10* (2012.01)

(52) U.S. Cl.
   CPC ............ *G06Q 40/02* (2013.01); *G06Q 10/10* (2013.01); *G06Q 20/10* (2013.01)

(58) Field of Classification Search
   None
   See application file for complete search history.

(56) References Cited

U.S. PATENT DOCUMENTS

| | | |
|---|---|---|
| 5,500,890 A | 3/1996 | Rogge et al. |
| 5,708,422 A | 1/1998 | Blonder et al. |
| 5,794,234 A | 8/1998 | Church et al. |
| 5,914,472 A | 6/1999 | Foladare et al. |
| 6,233,608 B1 | 5/2001 | Laursen et al. |
| 6,408,277 B1* | 6/2002 | Nelken ............... G06F 9/4881 718/103 |
| 6,535,855 B1* | 3/2003 | Cahill ............... G06Q 20/00 705/346 |

(Continued)

OTHER PUBLICATIONS

Irene, F. M. (1999). Insurance: Workflow as a separate application? Inform, 13(4), 16. Retrieved from https://dialog.proquest.com/professional/docview/217559004?accountid=131444 on Feb. 24, 2023 (Year: 1999).*

(Continued)

*Primary Examiner* — Kito R Robinson
(74) *Attorney, Agent, or Firm* — Foley and Lardner LLP

(57) ABSTRACT

A computer-implemented data processing system comprises account management logic, workflow logic, and interface logic. The account management logic is configured to manage financial accounts associated with a plurality of users. The workflow logic is configured to identify workflow items to be acted upon by users in connection with financial transactions relating to the financial accounts. The interface logic cooperates with the workflow logic to generate a plurality of display screens to be displayed by wireless handheld mobile devices. The display screens comprise a home page screen that is provided to the user upon login and that includes a link to a workflow screen where the user may act upon one or more of the workflow items.

20 Claims, 7 Drawing Sheets

(56) References Cited

U.S. PATENT DOCUMENTS

| | | | |
|---|---|---|---|
| 6,934,664 | B1 | 8/2005 | Webb et al. |
| 7,110,745 | B1 | 9/2006 | Smith et al. |
| 7,236,966 | B1 | 6/2007 | Jackson et al. |
| 8,321,919 | B2 | 11/2012 | Babeanu et al. |
| 8,793,164 | B2 | 7/2014 | Sendo et al. |
| 10,176,522 | B1 | 1/2019 | Lockwood-Stein et al. |
| 2001/0054022 | A1 | 12/2001 | Louie et al. |
| 2002/0026575 | A1 | 2/2002 | Wheeler et al. |
| 2002/0107007 | A1 | 8/2002 | Gerson |
| 2002/0174030 | A1 | 11/2002 | Praisner et al. |
| 2003/0036934 | A1 | 2/2003 | Ouchi |
| 2003/0101134 | A1 | 5/2003 | Liu et al. |
| 2003/0110129 | A1 | 6/2003 | Frazier et al. |
| 2003/0212629 | A1 | 11/2003 | King |
| 2003/0225703 | A1 | 12/2003 | Angel |
| 2004/0139016 | A1 | 7/2004 | Forzley |
| 2004/0260593 | A1 | 12/2004 | Abraham-Fuchs et al. |
| 2005/0027651 | A1* | 2/2005 | DeVault .............. G06Q 20/10 705/38 |
| 2005/0165684 | A1 | 7/2005 | Jensen et al. |
| 2005/0209902 | A1* | 9/2005 | Iwasaki .......... G06Q 10/0631 705/7.14 |
| 2006/0184437 | A1* | 8/2006 | Bruetting ............ G06Q 40/06 705/35 |
| 2006/0224507 | A1 | 10/2006 | Torpin et al. |
| 2006/0235777 | A1 | 10/2006 | Takata |
| 2007/0100749 | A1 | 5/2007 | Bachu et al. |
| 2007/0124361 | A1* | 5/2007 | Lowry ................ G06Q 40/00 709/201 |
| 2008/0078831 | A1 | 4/2008 | Johnson et al. |
| 2008/0086425 | A1 | 4/2008 | Ruggiero et al. |
| 2008/0301041 | A1 | 12/2008 | Bruk |
| 2009/0064280 | A1 | 3/2009 | Babeanu et al. |
| 2009/0216638 | A1 | 8/2009 | Matthews et al. |
| 2010/0191634 | A1 | 7/2010 | Macy et al. |
| 2012/0095913 | A1 | 4/2012 | Seay et al. |

OTHER PUBLICATIONS

Segal, R. B. (1999). Why workflow works. Mortgage Banking, 59(9), 92-101. Retrieved from https://dialog.proquest.com/professional/docview/234921111?accountid=131444 on Feb. 24, 2023 (Year: 1999).*

Alsop, M. R. (1994). Workflow automation integration requires a large technology toolkit and a structured approach. Computer Technology Review, , 23. Retrieved from https://dialog.proquest.com/professional/docview/220620063?accountid=131444 on Feb. 23, 2021 (Year: 1994).

Flexi International software announces FlexiWorkFlow; FlexiWorkFlow enhances FlexiFinancials with prebuilt templates to automate key business processes. (May 22, 1996). Business Wire Retrieved from http://dialog.proquest.com/professinal/docview/669734592?accountid=142257 on Oct. 25, 2019 (Year: 1996)6 pages.

McKie, S. (1994). The five levels of workflow: How workflow management technology will change the process of client/server accounting. DBMS, 7, p7(4). Retrieved from https://dialog.proquest.com/professional/docview/1088546819?accountid=131444 on Feb. 23, 2021 (Year: 1994).

Seeker software ships new compensation planning web solution; workplace managerial self-service application automates compensation and salary management via the web. (May 26, 1999). Business Wire Retrieved from http://dialog.proquest.com/professional/docview/667350787?accountid=142257 on Oct. 15, 2019 (Year: 1999)6 pages.

Segal, R. B. (1999). Why workflow works. Mortgage Banking, 59(9), 92-101. Retrieved from https://dialog.proquest.com/professional/docview/234921111?accountid=131444 on Feb. 23, 2021 (Year: 1999).

* cited by examiner

500

Home > IPP > Exceptions Awaiting Decision

All | INNR | REG $ Differs | Others

<< [ 1 - 5 of 11 Items ] >>

| | |
|---|---|
| Serial Number: | 123456 |
| Amount: | 505,450.00 USD |
| Exception Type: | REG $ Differs |
| Account: | 1234567890 |
| Deadline: | 00:00 CST |
| Default Decision: | Pay |

Pay | Return | Edit | Image  ← 512

| | |
|---|---|
| Serial Number: | 123456 |
| Amount: | 505,450.00 USD |
| Exception Type: | REG $ Differs |
| Account: | 1234567890 |
| Deadline: | 00:00 CST |

FIG. 5

GRAPHICAL USER INTERFACE SYSTEM AND METHOD

CROSS-REFERENCE TO RELATED APPLICATIONS

The present application is a continuation of and claims priority to U.S. patent application Ser. No. 16/723,994, filed Dec. 20, 2019, which itself is a continuation of and claims priority to U.S. patent application Ser. No. 12/463,298, filed May 8, 2009, which itself claims priority to U.S. Provisional Patent Application No. 61/053,478, filed May 15, 2008, the contents of each of which are hereby incorporated by reference in their entireties.

BACKGROUND

On-line banking tools offer customers of financial institutions a convenient mechanism to manage their accounts without having to visit physical locations. Commercial on-line banking tools are available that permit users to perform operations relating to cash and treasury management, investment, procurement, international, trust, and credit and loan services, and so on. Additionally, users may be provided with alerts regarding workflow items in need of attention, and users may provide appropriate instructions in response to such alerts. Mobile banking solutions also exist that provide access to these same types of tools in a mobile environment. While existing on-line banking tools have proved useful, an ongoing need exists for further improvements.

SUMMARY

According to an example embodiment, a computer-implemented data processing system comprises account management logic, workflow logic, and interface logic. The account management logic is configured to manage financial accounts associated with a plurality of users. The workflow logic is configured to identify workflow items to be acted upon by users in connection with financial transactions relating to the financial accounts. The interface logic is configured to connect the data processing system to computing systems associated with the plurality of users by way of a communication network. The computing systems include wireless handheld mobile devices. The interface logic cooperates with the workflow logic to generate a plurality of display screens to be displayed by the wireless handheld mobile devices. The display screens comprise a home page screen provided to the user upon login. The home page screen includes a link to a workflow screen where the user may act upon one or more of the workflow items.

BRIEF DESCRIPTION OF THE DRAWINGS

FIG. 5 is a screen display that may be provided to a user responsive to the user making a second selection in FIG. 3, according to an example embodiment.

DETAILED DESCRIPTION OF EXAMPLE EMBODIMENTS

Figure 1:
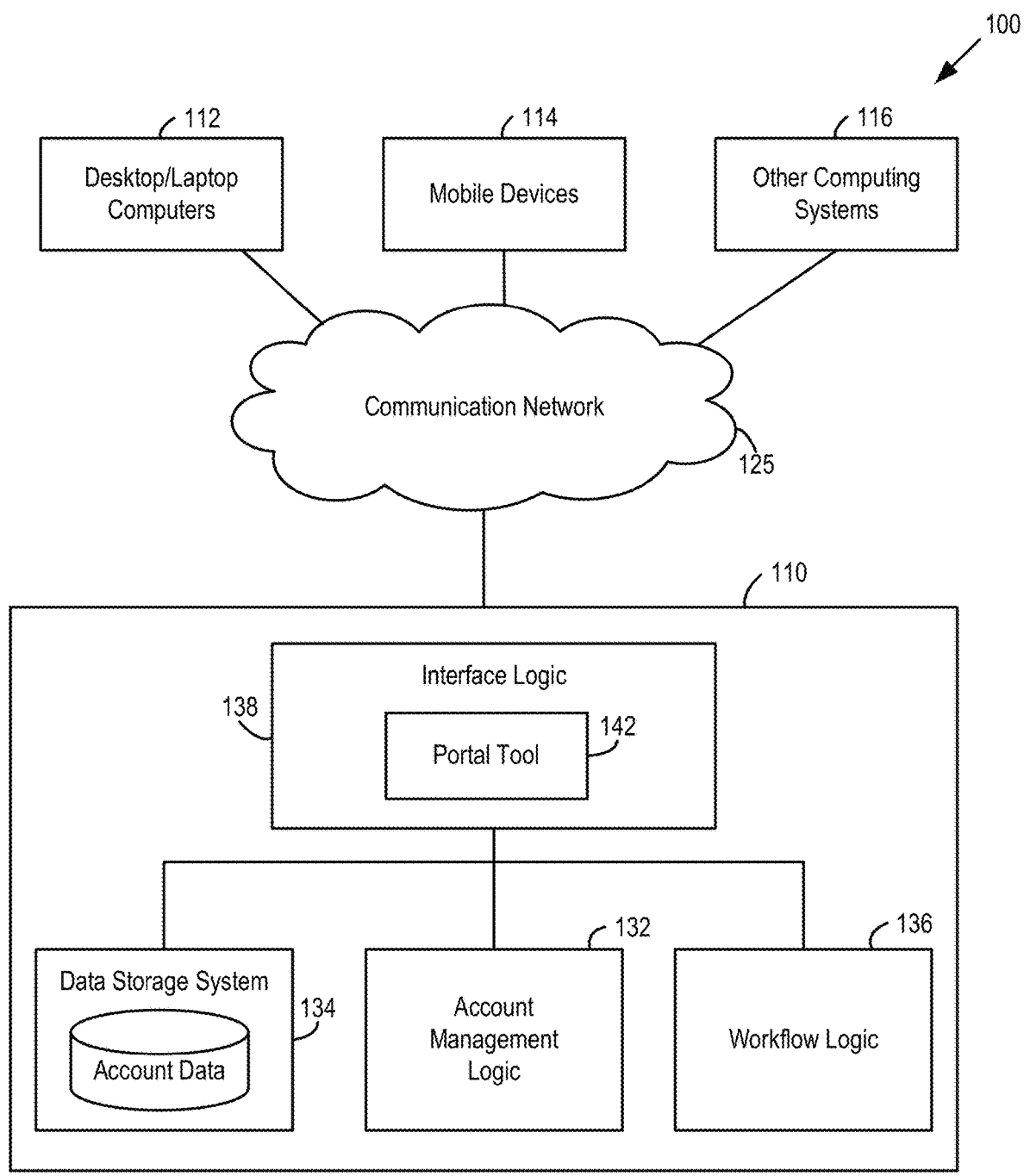
FIG. 1 is a block diagram of a data processing system that includes a portal tool with a user interface that includes workflow indicators, according to an example embodiment.

Referring now to FIG. 1, a data processing system 100 according to an example embodiment is shown. The data processing system 100 includes a system 110 provided by a financial institution and that may be accessed by various users, e.g., customers of the financial institution. For example, system 110 may be provided by a bank, and the users may be customers of the bank that access system 110 through an on-line banking area of a website of the bank. The users may access using various computing systems 112-116. The computing systems 112-116 may include computers 112 such as laptop or desktop computers (e.g., home computers, work computers, public computers, and so on), wireless handheld devices 114 (e.g., cell phones, mobile e-mail devices, and so on), and other computing devices 116. The computing systems 112-116 may access the system 100 through a communication network 125 which may, for example, include the Internet, telephone networks, wireless networks, point-to-point networks, and/or other networks. System 110 may be provided as an enterprise computing system that provides a variety of services for users internal and external to the bank.

System 110 may include account management logic 132, a data storage system 134, workflow logic 136, and interface logic 138. Such logic may, in practice, comprise a processor (e.g., a single microprocessor, a connected network of microprocessors/servers, etc.) and program instructions that are stored in memory and executed by the processor. As will be appreciated, although certain logic is shown, additional logic may also be provided.

The account management logic 132 is configured to manage financial accounts associated with various users. For example, in a commercial banking environment, the accounts are associated with the users (i.e., businesses) that are the holders of the accounts and with other users (i.e., humans) that are employed by the holders of the accounts. Each account may be associated with multiple human users (e.g., multiple human users may be authorized to perform operations in connection with a given business-owned account) and each human user may be associated with multiple accounts (e.g., where a business holds multiple accounts).

The account management logic 132 may, for example, maintain account information and store such account information in a data storage system 134. Account management logic 132 may include logic that performs account processing to process transactions in connection with the account(s) of the account holder, such as account debits and credits. Other operations may be performed relating to cash and treasury management, investment, procurement, international, trust, credit and loan services, and so on, as described in greater detail below in connection with FIG. 7.

The workflow logic 136 is configured to identify workflow items to be acted upon by users in connection with financial transactions relating to the financial accounts. For example, when a transaction requires approval by a particular user, the workflow logic 136 may be configured to provide an event notification to such user to obtain the needed approval. As will be appreciated, different users may be authorized to act upon different types of workflow items for different accounts, and some transactions may require approval from more than one user. For example, some users might be authorized to perform banking transactions, while others may only be authorized to view reports. The workflow logic 136 is configured to track the users that are authorized to perform various operations, and to take such information into account when routing workflow items for action by specific users.

Interface logic 138 is configured to connect the data processing system 110 to the computing systems 112-116 by way of the communication network 125. That is, the interface logic 138 permits the users to access financial accounts in system 110 by way of the communication network 125. For example, interface logic 138 may comprise one or more servers that provide a graphical user interface (e.g., a series of dynamically-generated web pages or other display screens) for users that access system 110. Generating such display screens may comprise providing over network 125 whatever data is necessary for the screen to be displayed. (As will be appreciated, actual displaying of the display screen occurs remotely and, in some embodiments, the data provided to cause such display screens to be displayed may be quite minimal.) The graphical user interface may be used to prompt the user to act upon workflow items, and to receive user instructions which are provided in response to such prompts. The interface logic 138 cooperates with the workflow logic 136 to generate the display screens to be displayed by the computing systems 112-116. An example of such a graphical user interface is described in greater detail below in connection with FIGS. 2-5.

Interface logic 138 includes portal tool 142 that provides a set of tools for users to access services offered through the data processing system 110, including tools relating to cash and treasury management, investment, procurement, international, trust, credit and loan services, and so on. For example, portal tool 142 permits users to manage accounts online, maintain check registers, view images of deposited and disbursed checks, print and download activity reports, approve or reject wires, view account balances, view cash flow in and out of accounts, view and respond to returned items, and so on. As indicated in FIG. 1, portal tool 142 is accessible using desktop/laptop computers 112, mobile devices 114, and other computing devices 116. Mobile devices 114 may be used to transact business in the same manner as if the user were using the desktop/laptop computers 112. For example, through devices 114, users may be provided with access to mobile versions of each of the above-mentioned reports and services available through portal tool 142. Examples of services that may be offered through the portal tool 142 are described in greater detail below in connection with FIG. 7.

Figure 2:
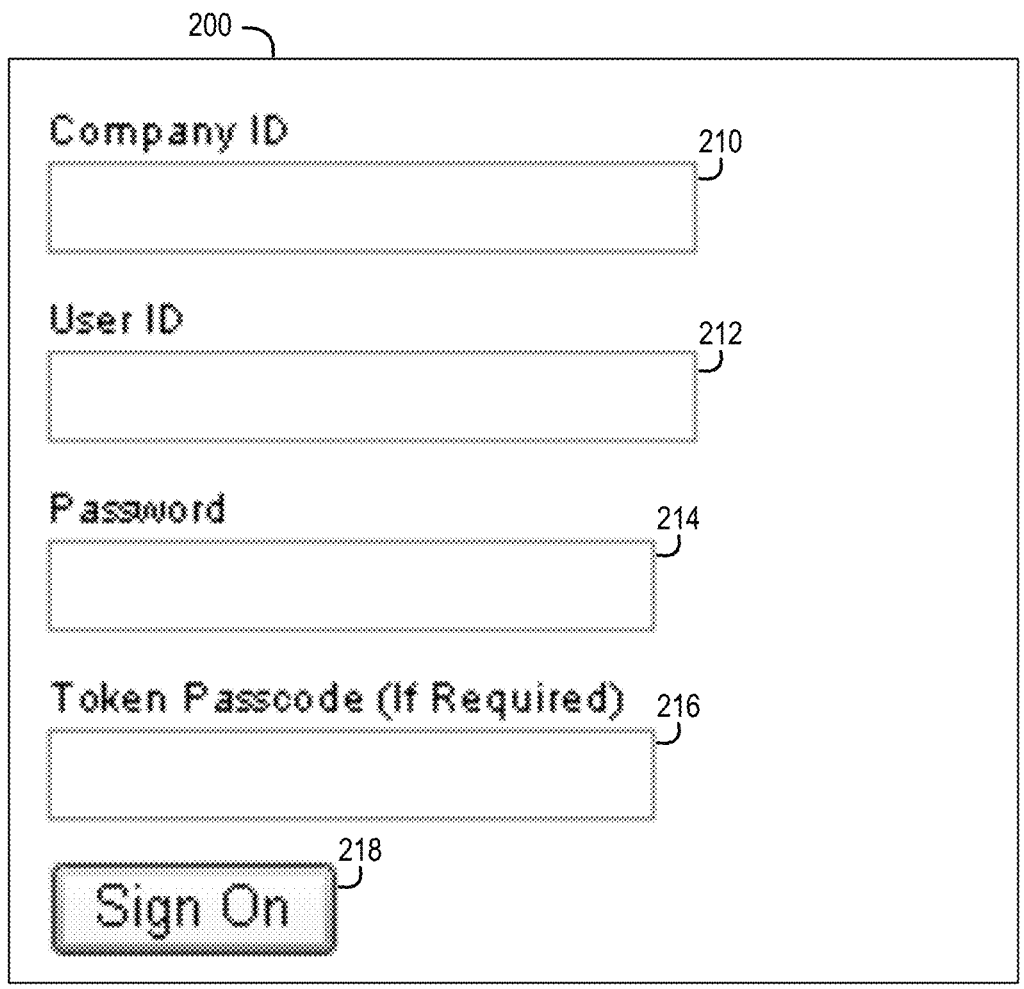
FIG. 2 is a screen display that may be provided to a user to permit the user to log in to the portal tool in the data processing system of FIG. 1, according to an example embodiment.

FIG. 2 shows a login screen 200 generated by the interface logic 138. In field 210, the user is prompted to enter a company identification, e.g., for the company that is the account holder of the account(s) to be accessed. In fields 212 and 214, the user is prompted to enter a user identification and password, respectively. In field 216, the user is prompted to enter a token passcode. The user may then click button 218 to gain access to services offered through the portal tool 142.

Figure 3:
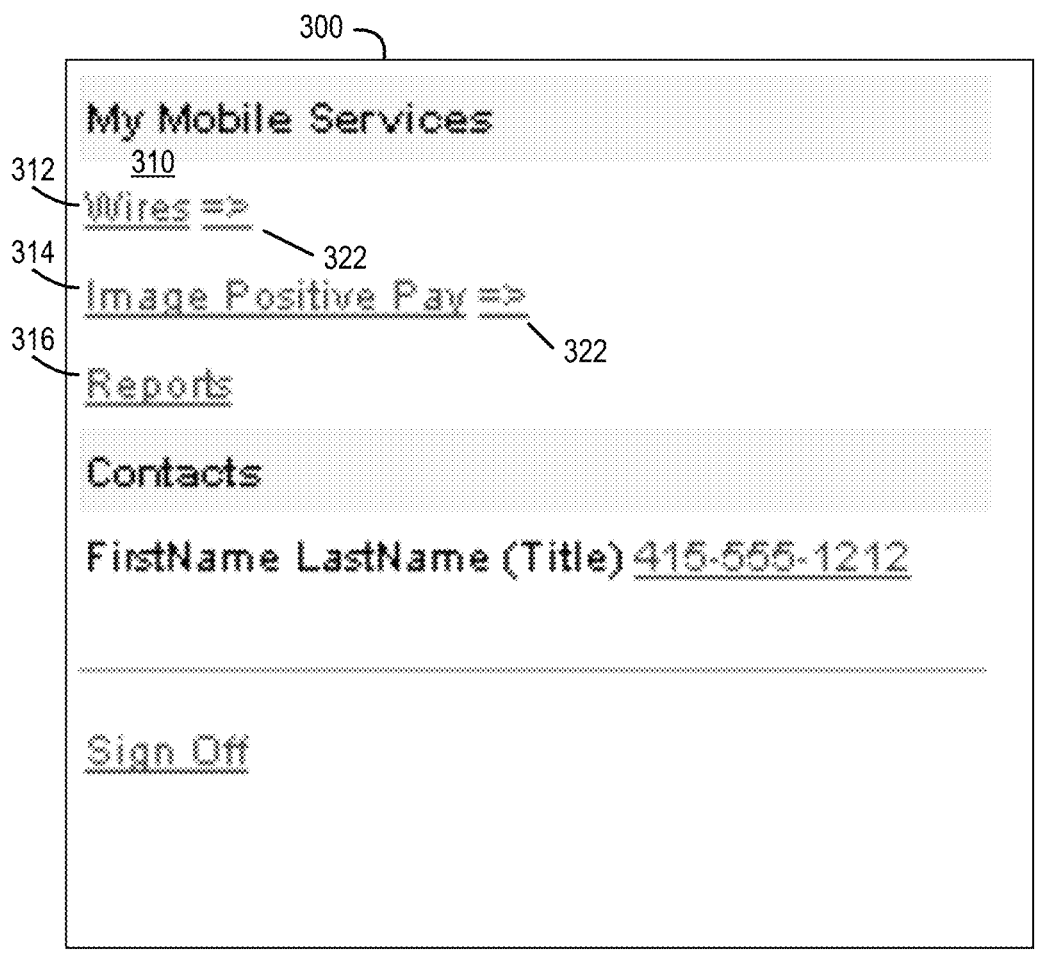
FIG. 3 is a home page screen display that may be provided to the user upon logging in to the portal tool shown in FIG. 1, according to an example embodiment.

FIG. 3 shows a home page screen 300 that is presented to the user upon logging in to the portal tool 142. As shown in FIG. 3, the user may be provided with a list 310 of links 312-316 to various services provided through portal tool 142. In combination, links 312-316 provide a menu of different possible categories of workflow items to be acted upon by the user. In the example of FIG. 3, link 312 is a link to a "wires" service. If the user selects link 312, the user is taken to a display screen potentially having a list of workflow items relating to wire transfers. Likewise, link 314 is a link to an "image positive pay" service and link 316 is a link to a "reports" service. If the user selects one of the links 314 or 316, the user is taken to an appropriate display screen potentially having a list of workflow items relating to the respective service.

As shown in FIG. 3, the user is also provided with a plurality of workflow indicators, such as links 322, adjacent to the links 312-316. In the example of FIG. 3, the links 322 may be shown as icons (e.g., "=>" in the illustrated example) next to specific menu choices for the user. Appearance of the links 322 indicates there are workflow items awaiting the user's action. That is, the links 322 serve as an alert. Additionally, as described in greater detail below, if a link 322 appears, it is an active link (underlined and clickable) so that the user has a path directly to the workflow items needing attention. The user saves time by bypassing any intervening screens. In this situation, the link 322 also serves as a navigation aid to specific workflow items.

As will be appreciated, a variety of services may be offered through portal tool 142, and a given user may only have access to some of the offered services depending, for example, on the authorizations the user has been provided, the user's job responsibilities, and/or other factors. Upon login, at home page screen 300, the list 310 of links that is provided to the user may list all services to which the user has access. At a given moment, however, there may not be any workflow items for the user to act upon within a given category. Thus, while appearance of the links 322 indicates there are workflow items awaiting the user's action, in contrast, absence of the links 322 indicates there are no workflow items awaiting the user's action. For example, in the example of FIG. 3, the reports category is listed, however, there are no workflow items awaiting the user within this category. The user saves time if there is no such link, and does not need to proceed further into the service.

Figure 4:
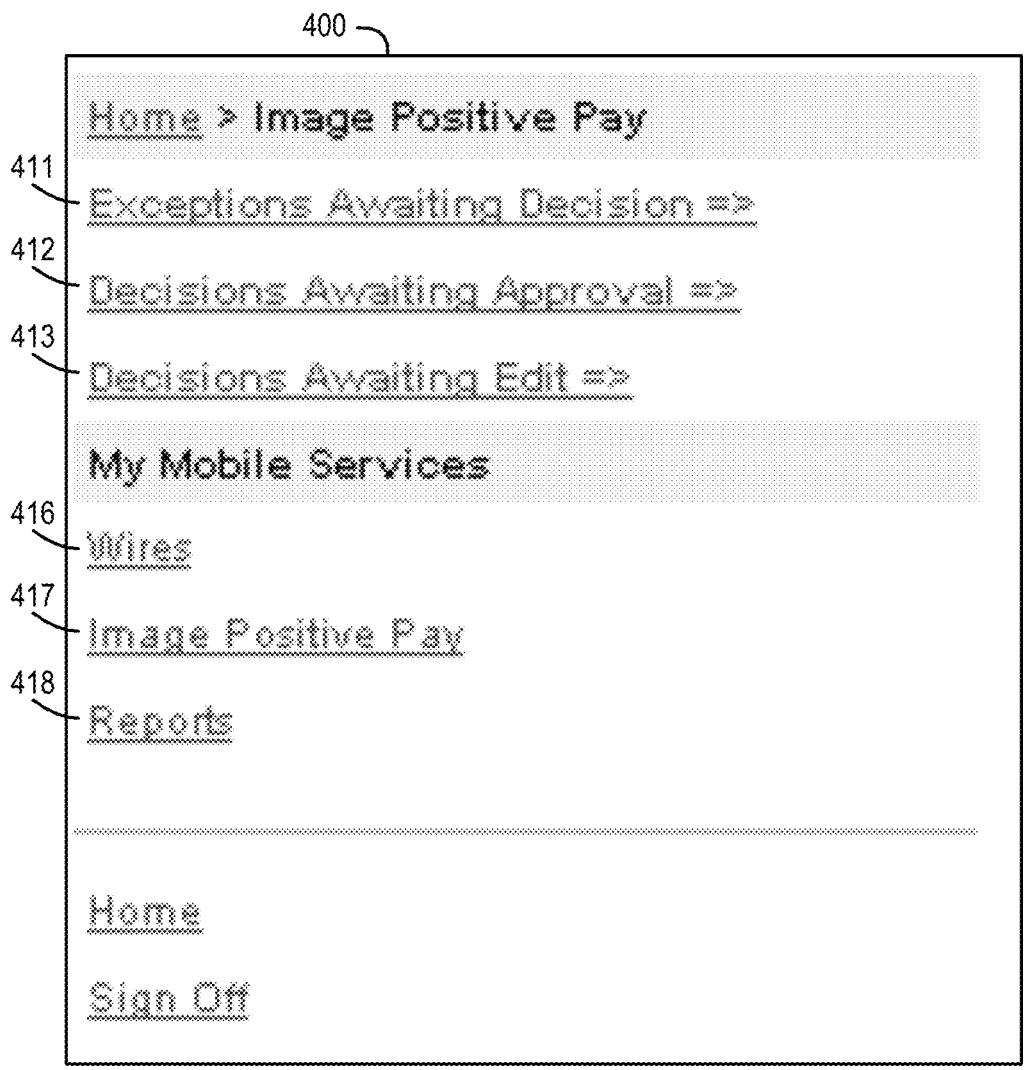
FIG. 4 is a screen display that may be provided to the user responsive to the user making a first selection in FIG. 3, according to an example embodiment.

Referring now to FIG. 4, FIG. 4 shows a screen 400 that is presented to the user in response to the user selecting one of the links 312-316 in FIG. 3. In the example of FIG. 4, the user selected link 314 to the "image positive pay" service, and is provided with a sub-menu of links 411-413 to sub-categories of workflow items needing the user's attention. In the example of FIG. 4, link 411 is a link to "exceptions awaiting decision," link 412 is a link to "decisions awaiting approval," and link 413 is a link to "decisions awaiting edit." Links 416-418 are also provided to other services.

Referring now to FIG. 5, FIG. 5 shows a screen 500 that is presented to the user in response to the user selecting one of the links 322 in FIG. 3. In the example of FIG. 5, the user selected link 322 adjacent the link 314 to the "image positive pay" service in FIG. 3 and, in response, has been routed to a specific workflow item within the category of "exceptions awaiting decision." Here, the user proceeds directly from their home page to workflow items requiring attention. Thus, the link 322 in FIG. 3 is not only an indicator of workflow items in need of the user's attention, but is also a navigational aid to a display screen where the user can attend to a specific workflow item. In FIG. 5, the user may act upon the workflow item by selecting one of the links 512 and thereby provide instructions to permit processing of the financial transaction to proceed.

As will be appreciated, the decisioning performed by the user in the context of FIG. 4 (whether to select link 412 relating to exceptions awaiting decision, link 413 relating to decisions awaiting approval, or link 414 relating decisions awaiting edit) is instead performed by workflow logic 136 in the context of FIG. 5. That is, to reduce the number of inputs to be received and screens to be displayed, the workflow logic 136 prioritizes the workflow items and routes the user to what is determined to be the highest priority workflow item awaiting action of the user. To this end, workflow logic 136 may include prioritization logic which assesses the relative priority of various workflow items based on factors such as the workflow item itself (a wire awaiting secondary approval), the user's role and authorizations (secondary wire approver), and the most likely user actions (biggest wire first). Using that information, the workflow items may be prioritized and the display screen may be dynamically created. In the context of a mobile environment, where screen size and user inputs are limited, this reduces the amount of time required for a mobile user to act upon workflow items by reducing the number of display screens visited. For example, as compared to the example in FIG. 4, the user visits only two display screens instead of three display screens, as previously indicated.

Figure 6:
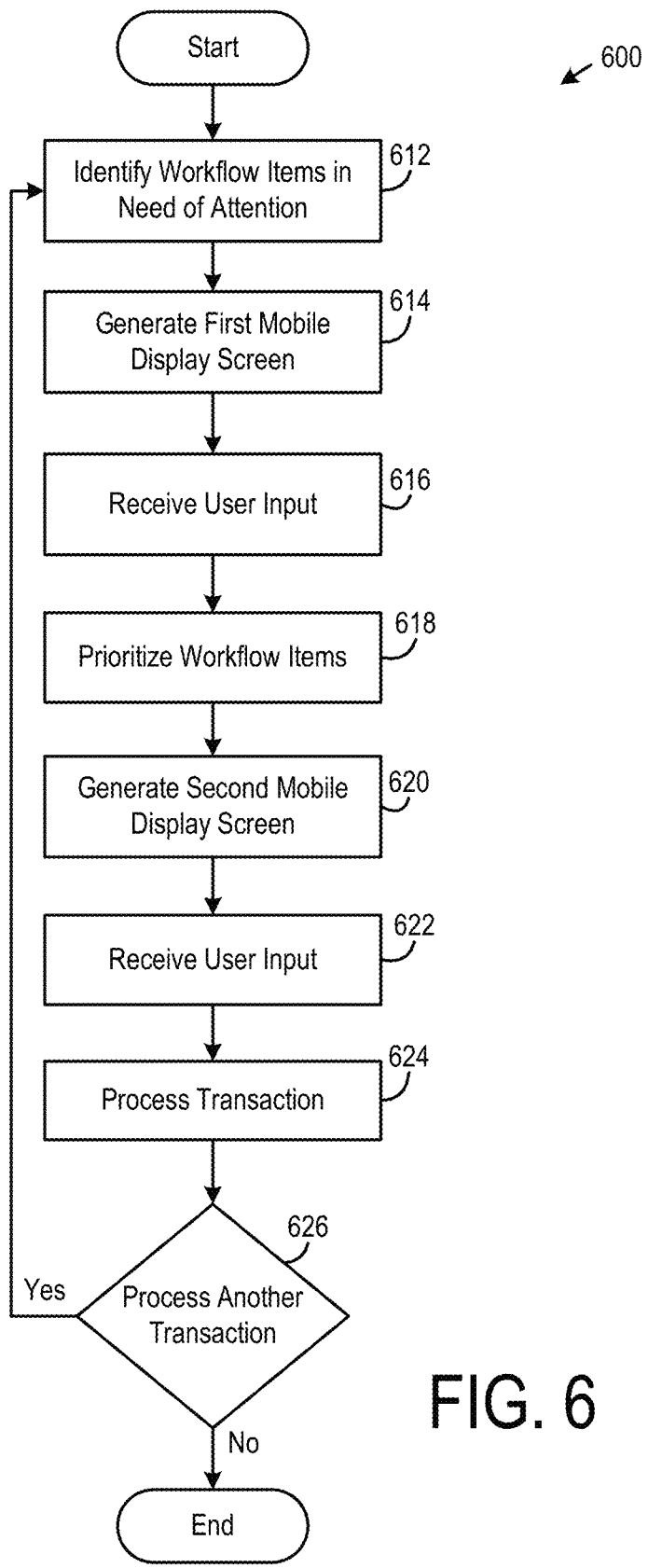
FIG. 6 is a flowchart showing a process for obtaining user inputs to process transactions using the portal tool of FIG. 1, according to an example embodiment.

Referring now to FIG. 6, a flowchart showing operation of the portal tool 142 is shown. When the user logs in to the portal tool 142, the user's home page is dynamically generated and customized to the user to reflect workflow items currently in need of the user's attention, as previously indicated. To this end, at step 612, the workflow logic 136 identifies the workflow items in need of attention. As will be appreciated, for each of the accounts in system 110, a list of pending financial transactions and workflow items may be maintained. The workflow logic 136 may review such financial accounts and workflow items to assess which, if any, the particular user may be authorized to provide instructions. The workflow logic 136 may assess various factors in this regard, for example, the authorization assigned to the user for work he/she can perform, the accounts for which the user is authorized, the existence of any workflow items in the queue(s) for that user, and so on.

At step 614, a display screen such as the display screen 300 of FIG. 3 is generated. As mentioned above in connection with FIG. 3, the user may be provided with a list 310 of links 312-316 to various services provided through portal tool 142. In addition, the user may also provided with a plurality of workflow indicators, such as links 322, adjacent to the links 312-316. The workflow indicators are placed adjacent to the links 312-316 based on the results of the analysis performed in step 612 (i.e., determining whether workflow items exist in various categories for the user). At step 616, a user selection of one of the workflow indicators (in FIG. 3, links 322) is received.

At step 618, the workflow items are prioritized. For example, in the example of FIGS. 3-5, if the user selects the image positive pay link 314, the workflow logic 136 prioritizes the workflow items within the image positive pay category. The prioritization may, for example, be based on which sub-categories (e.g. exceptions awaiting decision, decisions awaiting approval, decisions awaiting edit) have workflow items in need of the user's attention. The prioritization may further be based on which sub-category is a higher priority, based on the specific function being performed. The prioritization may further be based on processing deadlines, the user's role as an approver, the dollar amounts involved in the transaction, and/or other factors, depending on the nature of the workflow item. As will be appreciated, various prioritization arrangements may be employed.

At step 620, a second display screen is generated where the user may act upon the workflow item determined to have the highest priority in step 618. At step 622, additional user input is received which provide instructions regarding further processing of the pertinent financial transaction. For example, in FIG. 5, user selection of one of the links 512 is received. At step 624, the transaction is processed in accordance with the user's instructions. At step 626, it is determined whether there is another transaction to be processed. If more workflow items remain, then the process returns to step 612; otherwise, the process terminates.

Figure 7:
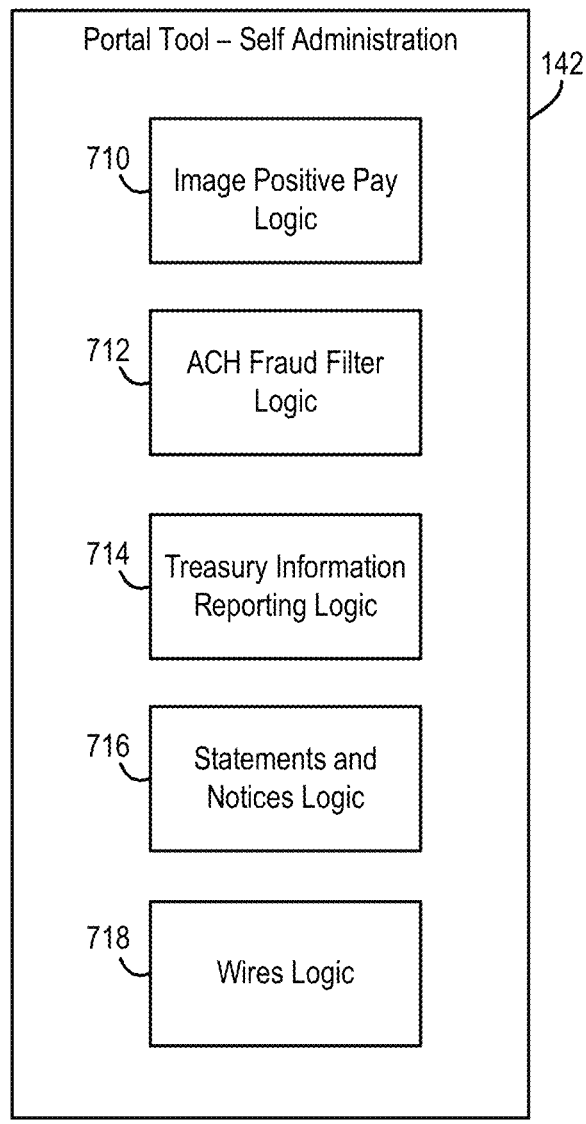
FIG. 7 is a block diagram showing a portal tool of FIG. 1 in greater detail, according to an example embodiment.

Referring now to FIG. 7 and Table I below, examples of workflow items that may be acted upon by users through portal tool 142 are provided. FIG. 7 shows additional logic provided by the portal tool 142 which may be used for self-administration of account activity by users. Table I shows corresponding examples of event notifications that may be provided to the user. The portal tool 142 may provide the user with display screens that permit the user to act upon workflow items that are responsive to the event notifications listed below. While certain examples have been given, it will be appreciated that other and/or different notifications and workflow items may also be provided.

TABLE I

Examples of notifications that may be provided

| Service | Event Messaging Notification | Relevant Service Authorizations | Users May Receive a Notification that: |
|---|---|---|---|
| Image Positive Pay (IPP) | Account Processing Complete | Image Positive Pay with at least one of the following services: View Exceptions, Initiate Decisions, Create Register, or Verify Decisions | The account processing has completed and positive pay exception items, (if any), including payee validation exceptions have been identified and are ready for the customer to make decisions. |
| Automated Clearing House (ACH) Fraud Filter | Unauthorized ACH Transactions | ACH Fraud Filter | A potentially unauthorized ACH transaction requires review or has been stopped and returned. |
| Statement & Notices | Stop Payment Notices | Statement and Notices with Stop Notice Service | A stop payment has been applied to a check and is available to be viewed. |
| Statement & Notices | Wholesale Deposit Adjustment Advice Available | Statement and Notices with Wholesale Deposit Adjustment Service | A deposit adjustment advice is available. |
| Treasury Information Reporting (TIR) | ACH Received Activity | TIR - ACH Receive Report | Intraday ACH transactions within a specified dollar range have posted to an account. |
| TIR | Incoming Wire | TIR - Wire Detail Report | An incoming wire has been received. |
| TIR | Intraday | TIR - Intraday | Account balance goes |

TABLE I-continued

Examples of notifications that may be provided

| Service | Event Messaging Notification | Relevant Service Authorizations | Users May Receive a Notification that: |
|---|---|---|---|
| | Report Balance | Composite Report or the Intraday Position Report | above or below a specified dollar threshold. |
| TIR | Outgoing Wire | TIR - Wire Detail Report | An outgoing wire has been sent. |
| TIR | Returned Items | TIR - Intraday Return Item Detail or the Previous Day Return Item Detail | Items have been returned. |
| Wires | Wires Rejected | Wire Transfer (Verify/Approve or Create) | A wire has been rejected. |
| Wires | Wire Requires Approval | Wire Transfer (Verify/Approve or Create) | A wire requires approval. |
| Wires | Wire Successful | Wire Transfer (Verify/Approve or Create) | A wire was processed successfully. |
| Wires | Wire Unsuccessful | Wire Transfer (Verify/Approve or Create) | A wire was not processed successfully. |

For example, in connection with image positive pay logic 710, the user may be provided with workflow items relating to potentially fraudulent check transactions. The image positive pay logic 710 may be configured to detect potentially fraudulent transactions in connection with checking accounts (e.g., counterfeit and stolen checks written on commercial accounts). The serial numbers and dollar amounts of checks presented for payment may be matched to the customer's (e.g., business's) issued check file. Checks that do not match or otherwise appear suspicious may be forwarded to a user for review before final payment. Thus, in the example of FIG. 5, the user is provided with details regarding the potentially fraudulent transaction, including the option to view the check image for the transaction. The user may then select a link which causes the check to be paid or to be returned unpaid, for example.

With regard to the ACH fraud filter logic 712, the user may be provided with workflow items relating to potentially fraudulent automated clearing house (ACH) transactions. The fraud filter logic 712 may be configured to automatically block ACH debits and/or credits from posting to a commercial account or reported to the customer for a pay or return decision. Again, the user may be provided with a display screen that includes details regarding the potentially fraudulent transaction. The user may then select a link which causes the check to be paid or to be returned unpaid.

With regard to treasury information reporting logic 712, the user may be provided with workflow items relating to situations where there is cash flow activity with regard to an account, for example, when intraday ACH transactions within a specified dollar range have posted to an account, an incoming wire has been received, an account balance has either increased above a predetermined maximum threshold or decreased below a predetermined minimum threshold, an outgoing wire has been sent, items have been returned, and so on. For example, if the account balance has increased above a predetermined maximum threshold, the user may be provided with links that enable the user to move funds out of the account and into other accounts, such as higher-yield investment accounts. Conversely, if the account balance has decreased below a predetermined minimum threshold, the user may be provided with links that enable the user to move funds into the account.

With regard to wires logic 716, the user may be provided with workflow items relating to situations where a wire has been rejected, a wire requires approval, a wire was processed successfully, a wire was not processed successfully, and so on. For example, for a wire that requires approval, a display screen may be generated that provides details regarding the proposed wire transaction and further provides links to the user to indicate approval of the wire. With regard to statements and notices logic 714, the user may be provided with workflow items relating to situations where a stop payment has been received on a check and situations where deposit adjustment advice is available.

The portal tool 142 is configured to provide the above-mentioned notifications through the network 125 (e.g., via e-mail, text message, etc.). Such notifications may alert the user to log on to the portal tool 142. Once such a notification is received, the user may log in to the portal tool 142 to respond to the notification. The parameters of transactions types or events that trigger such notifications may be user-configurable, to permit users to decide what transactions or events should trigger such notifications. The delivery method of the notification (e.g., email, text message, etc.) may also be configured. The frequency of the notifications may also be configured (e.g., whether notifications are received immediately, whether multiple events are packaged into a single notification at specific time intervals, etc.).

As previously indicated, different users may have different authorities to access different accounts, including within the accounts of a given business, depending on the user's job responsibilities for that business. The portal tool 142 may be configured to permit an administrator to configure who has access to the company's accounts and services. The portal tool 142 permits administrators to establish user access to services, edit and disable user IDs, and enroll company employees in new services. The portal tool 142 also permits administrators to set dollar limits for users authorized to perform wire transactions. The portal tool 142 also permits administrators to specify transaction types that require approval by a second administrator before being completed.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method, comprising:
   identifying, by one or more processors, a plurality of workflow items relating to transactions associated with an account;
   determining, by the one or more processors, a respective priority for each workflow item of the plurality of workflow items such that a first workflow item of the plurality of workflow items has a highest priority, the respective priority determined based on an attribute of the workflow item and actions associated with the workflow item;
   in response to determining that the first workflow item has the highest priority, generating, by the one or more processors, a first display screen for a remote computing device, the first display screen comprising a link to the first workflow item and a workflow indicator indicating that the first workflow item associated with the link is awaiting action, the first display screen providing a respective indication of each workflow item of the plurality of workflow items according to the respective priority of the workflow item;

receiving, by the one or more processors from the remote computing device, an indication of an interaction with the link;

responsive to receiving the indication of the interaction with the link, generating, by the one or more processors, a second display screen relating to the first workflow item for the remote computing device;

receiving, by the one or more processors from the remote computing device, an instruction to approve or reject processing of a transaction initiated by a user that is authorized to use the account at the second display screen;

processing, by the one or more processors, the transaction in accordance with the instruction; and generating, by the one or more processors, a next display screen relating to a next workflow item of the plurality of workflow items based on the respective priority of the plurality of workflow items.

2. The method of claim 1, further comprising providing, by a portal tool included within interface logic executed by the one or more processors, self-administration of account activity for the account, the portal tool including at least one of image positive pay logic, ACH fraud filter logic, treasury information reporting logic, statements and notices logic, and wires logic.

3. The method of claim 1, wherein identifying the plurality of workflow items further comprises assessing, by the one or more processors, authorization of action upon the plurality of workflow items by an operator of the one or more processors.

4. The method of claim 1, wherein at least one of the first display screen or the next display screen comprises one or more categories of the plurality of workflow items and a plurality of links each provided adjacent to a respective one of the one or more categories of the plurality of workflow items.

5. The method of claim 4, wherein the one or more categories include a category pertaining to a check processing service, and wherein at least one of the plurality of workflow items pertains to providing instructions in connection with a potentially fraudulent check transaction.

6. The method of claim 4, wherein the one or more categories include a category pertaining to automated clearing house transactions, and wherein at least one of the plurality of workflow items pertains to providing instructions in connection with a potentially fraudulent automated clearing house transaction.

7. The method of claim 4, wherein the one or more categories include a category pertaining to treasury management, and wherein at least one of the plurality of workflow items pertains to providing instructions in connection with an account balance that has either increased above a predetermined maximum threshold or decreased below a predetermined minimum threshold.

8. The method of claim 4, wherein the one or more categories include a category pertaining to treasury management, and wherein at least one of the plurality of workflow items pertains to providing instructions in connection with returned items.

9. The method of claim 4, wherein the one or more categories include a category pertaining to wire transfers, and wherein at least one of the plurality of workflow items pertains to providing instructions in connection with a wire transfer that requires approval.

10. The method of claim 1, wherein determining the priority of the plurality of workflow items is further based on one or more of:
a category of each of the plurality of workflow items;
a function being performed for each of the plurality of workflow items;
a processing deadline for each of the plurality of workflow items; or
a dollar amount of the transaction.

11. A system, comprising:
one or more processors coupled to memory, the one or more processors configured to:
identify a plurality of workflow items relating to transactions associated with an account;
determine a respective priority for each workflow item of the plurality of workflow items such that a first workflow item of the plurality of workflow items has a highest priority, the respective priority determined based on an attribute of the workflow item and actions associated with the workflow item;
generate, responsive to determining that the first workflow item has the highest priority, a first display screen for a remote computing device, the first display screen comprising a link to the first workflow item and a workflow indicator indicating that the first workflow item associated with the link is awaiting action, the first display screen providing a respective indication of each workflow item of the plurality of workflow items according to the respective priority of the workflow item;
receive, from the remote computing device, an indication of an interaction with the link;
generate, responsive to receiving the indication of the interaction with the link, a second display screen relating to the first workflow item for the remote computing device;
receive, from the remote computing device, an instruction to approve or reject processing of a transaction initiated by a user that is authorized to use the account at the second display screen;
process the transaction in accordance with the instruction; and
generate a next display screen relating to a next workflow item of the plurality of workflow items based on the priority of the plurality of workflow items.

12. The system of claim 11, wherein the one or more processors are further configured to provide self-administration of account activity for the account via a portal tool executed by the one or more processors, the portal tool including at least one of image positive pay logic, ACH fraud filter logic, treasury information reporting logic, statements and notices logic, and wires logic.

13. The system of claim 11, wherein the one or more processors are further configured to identify the plurality of workflow items by performing operations comprising assessing authorization of action upon the plurality of workflow items by an operator of the one or more processors.

14. The system of claim 11, wherein at least one of the first display screen or the next display screen comprises one or more categories of the plurality of workflow items and a plurality of links each provided adjacent to a respective one of the one or more categories of the plurality of workflow items.

15. The system of claim 14, wherein the one or more categories include a category pertaining to a check processing service, and wherein at least one of the plurality of workflow items pertains to providing instructions in connection with a potentially fraudulent check transaction.

16. The system of claim 14, wherein the one or more categories include a category pertaining to automated clearing house transactions, and wherein at least one of the plurality of workflow items pertains to providing instructions in connection with a potentially fraudulent automated clearing house transaction.

17. The system of claim 14, wherein the one or more categories include a category pertaining to treasury management, and wherein at least one of the plurality of workflow items pertains to providing instructions in connection with an account balance that has either increased above a predetermined maximum threshold or decreased below a predetermined minimum threshold.

18. The system of claim 14, wherein the one or more categories include a category pertaining to treasury management, and wherein at least one of the plurality of workflow items pertains to providing instructions in connection with returned items.

19. The system of claim 14, wherein the one or more categories include a category pertaining to wire transfers, and wherein at least one of the plurality of workflow items pertains to providing instructions in connection with a wire transfer that requires approval.

20. The system of claim 11, wherein the one or more processors are further configured to determine the priority of the plurality of workflow items further based on one or more of:
- a category of each of the plurality of workflow items;
- a function being performed for each of the plurality of workflow items;
- a processing deadline for each of the plurality of workflow items; or
- a dollar amount of the transaction.

* * * * *